(12) United States Patent
Govindarajan et al.

(10) Patent No.: US 10,546,297 B2
(45) Date of Patent: Jan. 28, 2020

(54) HARDWARE AND TOKEN BASED USER AUTHENTICATION

(71) Applicant: PAYPAL, INC., San Jose, CA (US)

(72) Inventors: Satish Narayan Govindarajan, Los Altos, CA (US); Gunabalan Babu, Milpitas, CA (US); Khiem Nguyen Pham, Pleasanton, CA (US); Carlos Manuel Rivas, Redwood City, CA (US); Guhan Senguttuvan, San Jose, CA (US); Anantharaj Uruthiralingam, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 765 days.

(21) Appl. No.: 15/199,637

(22) Filed: Jun. 30, 2016

(65) Prior Publication Data

US 2018/0005244 A1 Jan. 4, 2018

(51) Int. Cl.
*G06Q 20/40* (2012.01)
*G06Q 20/38* (2012.01)

(52) U.S. Cl.
CPC ..... *G06Q 20/40145* (2013.01); *G06Q 20/382* (2013.01)

(58) Field of Classification Search
USPC ........................................................ 235/379
See application file for complete search history.

(56) References Cited

U.S. PATENT DOCUMENTS 8,823,497 B2 * 9/2014 Hutzler .............. G06K 9/00892
235/382

* cited by examiner

*Primary Examiner* — Rafferty D Kelly
(74) *Attorney, Agent, or Firm* — Haynes and Boone LLP

(57) ABSTRACT

Systems and methods for data visualization are disclosed. An example method includes: obtaining, via a user device, first user biometric data from a user; comparing the first user biometric data with first stored user biometric data. The first stored user biometric data are stored in a hardware secure element of the user device. The method further includes: determining that the first user biometric data matches the first stored user biometric data; and in response to the determining, transmitting a payment token to a merchant device. The payment token is configured to enable a payment to be made from a payment account associated with the user to a merchant associated with the merchant device.

20 Claims, 5 Drawing Sheets

HARDWARE AND TOKEN BASED USER AUTHENTICATION

TECHNICAL FIELD

The present disclosure relates generally to user authentication, and in particular, to user authentication and confidential information management using a hardware component and tokens stored with the hardware component.

BACKGROUND

A user sometimes may have to give out confidential information (e.g., a home address) or payment instrument information (e.g., credit card numbers) to a third party who is not well-equipped to protect it. For example, when financing a car purchase, a user may have to give a small car dealership her social security number, date of birth, credit information, and home address.

This may subject the user to future fraud, e.g., when a hacker steals the confidential user information from the small car dealership's unprotected customer database server. The problem exacerbates when the user has no strong trust relationship with a third party, e.g., a merchant located and operating from overseas or an online merchant with no brick-and-mortar store.

There is therefore a need for a device, system, and method, which provides enhanced user authentication and confidential information management.

Figure 1:
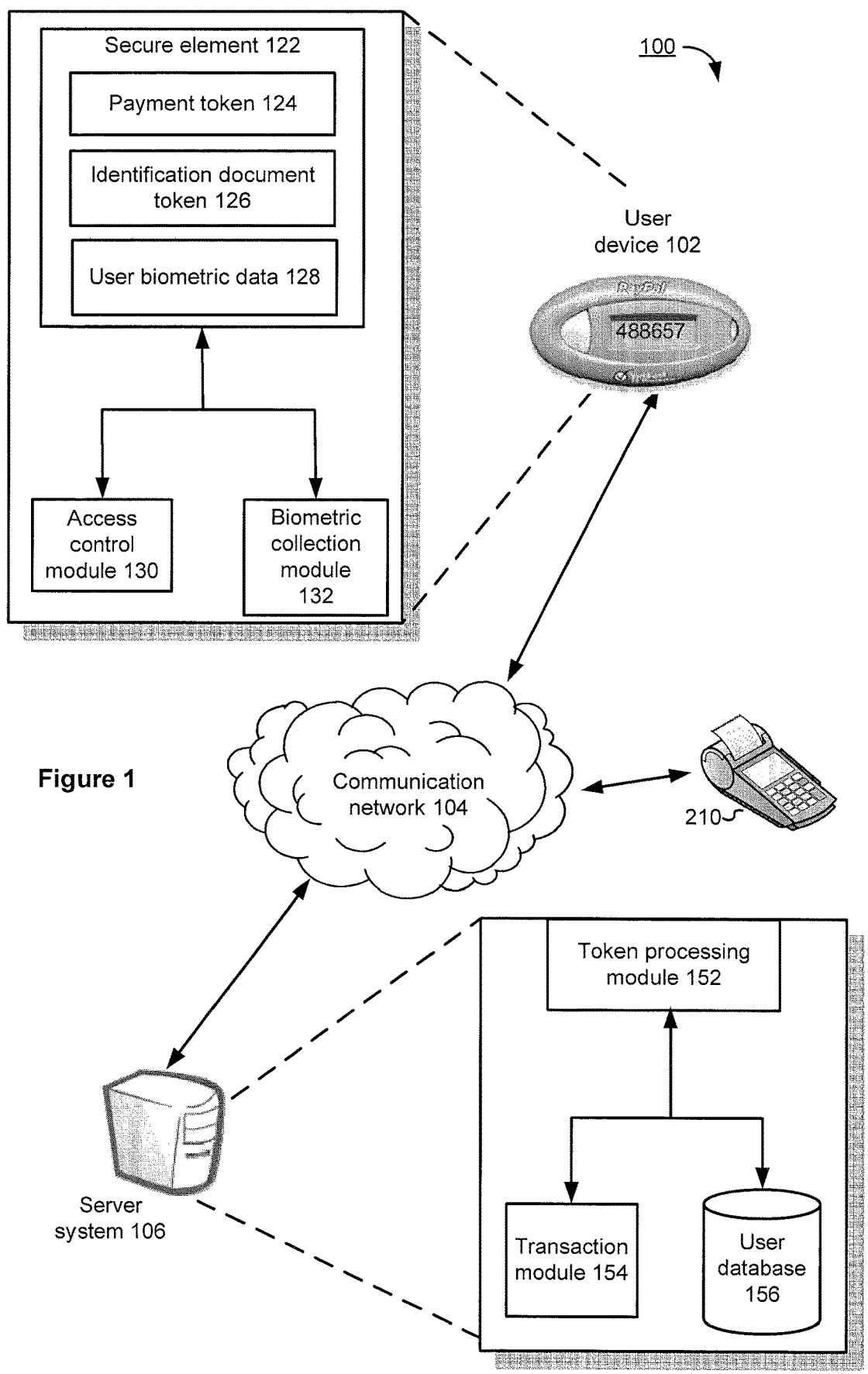
FIG. 1 is a schematic view illustrating an embodiment of a system for user authentication and confidential information management using a hardware component.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for user authentication and confidential information management using a hardware component and software tokens stored with the hardware component.

When overseas, for example, a user may be reluctant to provide confidential information (e.g., her passport number) or payment instrument information (e.g., credit card numbers) to a local merchant (e.g., a local car rental agency), from which legal protection against fraudulent transactions might be difficult to obtain. The user, however, may still need to give out at least some information in order to transact with such a merchant, e.g., renting a car for travelling in a foreign country.

In order to complete the transaction, the user may authenticate herself on a mobile device that she carries, based on her biometric data, e.g., a fingerprint. Upon a successful authentication, the mobile device can, e.g., contactlessly, present a payment token to the merchant, such as through a "tap" or local wireless communication with a merchant device. The token may be redeemed or otherwise used by the merchant for payment with a payment service provider, assuming the token and/or transaction meet restrictions set by the user.

The systems and methods described in the present disclosure can provide a variety of technical advantages.

First, a user does not need to provide confidential information, e.g., a credit card number, to the merchant with whom she transacts; rather, only a payment token that is redeemable for payment with certain restrictions is provided to the merchant.

Second, a user's biometric data is collected by and maintained on the user's mobile device in accordance with user-specified data access policies. This biometric data need not to be, and are indeed sometimes prevented from being, transmitted to an external device for the purpose of either authenticating the user or transacting with a merchant.

Additional details of implementations are now described in relation to the Figures.

FIG. 1 is a schematic view illustrating an embodiment of a system 100 for user authentication and confidential information management using a hardware component, such as a fob. The system 100 may comprise or implement a plurality of servers and/or software components that operate to perform various technologies provided in the present disclosure.

As illustrated in FIG. 1, the system 100 may include a user device 102 and a server system 106 in communication over a communication network 104. In the present disclosure, a user device may be a mobile payment device, a smartphone, a laptop computer, a notebook computer, a mobile computer, or a desktop computer.

In one embodiment, the user device 102 collects user biometric data (e.g., fingerprint, voice data, and/or facial features) and compares the collected user biometric data with the user biometric data 128 stored in a secure element 122 of the user device 102.

The user device 102 may include a biometric collection module 132, for example, (1) a camera for capturing facial, bodily, or other observable features of a user, (2) a microphone for capturing voice or other audible features of a user, and/or (3) a fingerprint collector for capturing a user's fingerprint.

The camera may be a high resolution imaging device capable of capturing a user's eye color, hair color, the distance between a user's nose and the user's mouth, the distance between the user's eyes, the length of the user's index finger, a tattoo on the user's left arm, and other immutable facial or bodily features of the user.

The microphone may be a high resolution sound collecting device capable of capturing a user's pronunciation of certain words, phrases, or sentences; and the fingerprint collector may be a high resolution fingerprint imaging device capable of capturing a user's one or more fingerprints and palm prints.

The biometric collection module 132 may also compare biometric data collected from a user with those stored in the secure element 122 and determine whether they bear a predefined number of similarities to each other (and thus whether they match).

For example, based on a ten-point match between a fingerprint collected from a user and a fingerprint stored in the secure element 122, the biometric collection module 132 may determine that these two fingerprints match and therefore authenticate the user on the user device.

For another example, the biometric collection module 132 may apply one or more image, object, and character recognition techniques to a photo of a user's left hand to determine whether the user's left hand has a light complexion, whether there is a tattoo near the user's left thumb, and, whether the tattoo includes the word "love," as indicated by a photo of the user's left hand stored in the secure element 122 or as described by textual descriptions stored in the secure element 122.

For a third example, the biometric collection module 132 may apply one or more voice recognition techniques to an audio or video content item provided by a user to determine the user's average voice pitch, speech speed, accent, and dialect usage. The biometric collection module 132 may then determine whether the audio or video content item provide by the user matches voice patterns stored in the secure element 122 and authenticate the user or not on that basis.

The user device 102 may include an access control module 130 for conditionally transmitting a payment or identity token to an external device or presenting a payment or identity token on the user device. For example, after a successful authentication of a user, the access control module 130 may, using a GPS device communicatively connected to the user device 102, determine a current location of the user device (and thus that of the user in possession of the user device 102). The access control module 130 may compare the current location of the user to a list of user-specified locations to determine whether a token can be accessed or used.

For another example, after a successful authentication of a user, the access control module 130 may, using a timing device communicatively connected to the user device 102, determine a time and date of a user transaction, which requires a payment token from the user device. The access control module 130 may compare the time and date of the user transaction (e.g., Saturday at 3 am) to a list of user-specified time periods and dates (e.g., Monday to Friday, 8 am to 5 pm) to determine whether a token can be accessed or used.

The secure element 122 includes a hardware storage area for storing private data—such as a digital identification (ID) or a password of a user—in such a way that it is difficult to compromise (e.g., with multiple levels of encryptions or access restrictions). For example, a secure element of a device may be located in a Universal Integrated Circuit Card (UICC), a Subscriber Identity Module (SIM) card, Secure Data (SD) card or embedded Secure Element (eSE), any of which may be plugged into or otherwise connected with a user device.

In some embodiments, the secure element 122 stores one or more payment tokens, one or more identification document tokens 126, and user biometric data 128 known to belong to an owner of a payment account (e.g., a credit card account) or an identification document (e.g., a passport). In some embodiments, a payment token includes encrypted data that, once decrypted, uniquely identifies a user's payment account registered with a payment service provider. For example, a payment token may be a virtual credit card number ("123-456-789-00") that is known to a credit card issuer or an account owner—but not a merchant that is in possession of the virtual credit card number—that the virtual credit card number corresponds to a particular credit card account ("4536-6898-5264-5978").

In some implementations, the communication network 104 interconnects a user device 102 with a merchant device 210, and with the server system 106. In some implementations, the communication network 104 optionally includes the Internet, one or more local area networks (LANs), one or more wide area networks (WANs), other types of networks, or a combination of such networks.

In one embodiment, the server system 106 generates one or more payment tokens or identification document tokens per a user request and transmits the tokens to a user device for storage in its secure element.

In one embodiment, the server system 106 obtains a payment token from the merchant device 210 (e.g., a POS machine) and provides a payment from a user account identified by the payment token to the merchant—while affirmatively withholding (e.g., preventing) from transmission to the merchant device, information identifying the user or the user account, e.g., the account holder's name, the account number, the expiration date and verification code of a credit card, or the routing number of a checking account.

The token processing module 152, in one embodiment, identifies information stored in a user database 156 in accordance with a token obtained from a merchant device or any other device. For example, based on a QR code received from a merchant POS machine, the token processing module 152 may identify a payment account registered in the user database 156 as well as one or more payment methods (e.g., a credit card account, a checking account, and a loan account) registered under that payment account. For another example, based on a PIN code received from a user identification verification machine (e.g., an age verification device at a liquor store), the token processing module 152 may identify an official or certified electronic driver's license registered in the user database 156 and present information associated with the electronic driver's license, including an image of the driver's license, to the user identification verification machine.

The transaction module 154, in one embodiment, processes a payment based on a user account identified by the token processing module 152.

In some implementations, user biometric data is not presented either from a user or from a verification computer server or cloud to a requestor system (for example, a POS machine, a security screening machine at an airport, or a passport screening machine at a point of entry). Rather specific encrypted tokens related to these requests are provided to requestors/systems.

In some implementations, the submissions of requested tokens are restricted based proximity of user's registered mobile device to the requestor's location. This may be referred to as a binding process. For example, when a user device is within a predefined proximity (e.g., 10 feet) to a POS machine, the access control module on the user device may transmit a payment token to the POS machine; when the user device is beyond the predefined proximity to a POS machine, suggesting that the user is not conducting an in-person transaction, the access control module on the user device may decline providing the payment token to the POS machine.

In some implementations, the hardware secure element is a core component to store and process user biometrics or any other tokens; user biometric data is not transferred to an external device, such as external requestors/systems.

Figure 2:
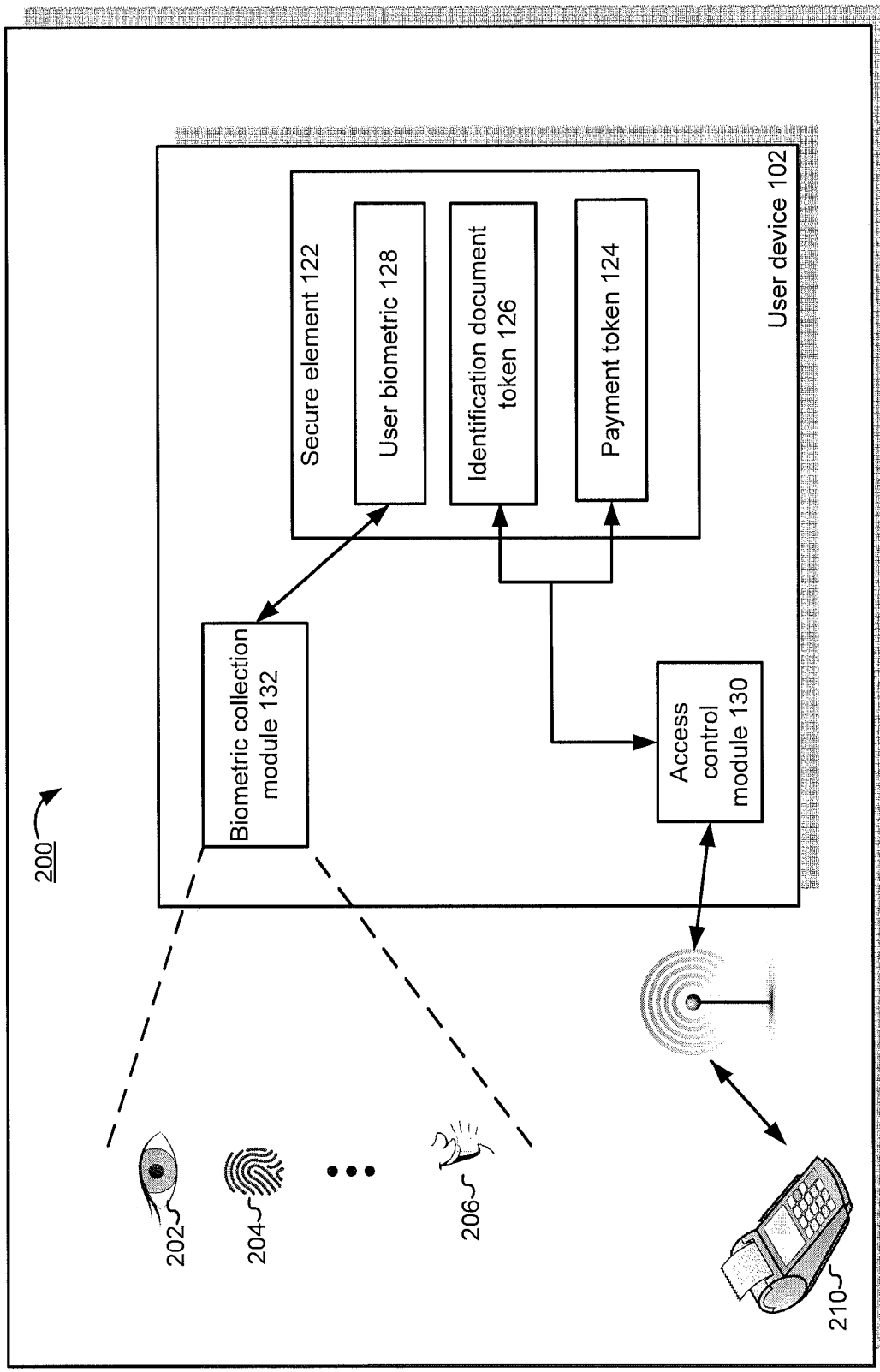
FIG. 2 is a schematic view illustrating an embodiment of a system for user authentication and confidential information management using a hardware component.

FIG. 2 is a schematic view illustrating an embodiment of a method 200 for user authentication and confidential information management using a hardware component and software tokens. The device 102, for example, when programmed in accordance with the technologies described in the present disclosure, can perform the method 200.

As shown in FIG. 2, the biometric collection module 132 may collect user biometric data from a user. The user biometric data may include an eye iris pattern 200, a fingerprint 204, and/or a voice pattern 206.

The biometric collection module 132 may compare the collected user biometric data with the user biometric data stored in the secure element 122 and determine whether there is a match.

If there is a match, then the access control module 130 may determine whether a user-specified restriction is triggered. For example, if a user has specified that the payment token 124 can be provided to an external device, e.g., a POS device, when the location of the user device is within the continental United States, but the current GPS location of the user device is in China, the access control module 130 may refuse to provide a payment token to the requesting external device or otherwise render the token unusable for the particular transaction, such as deactivating the token or declining authorization for use of the token. Thus, when details of the transaction violate use of the token, such as based on location, time, and/or amount, the token may be prevented from being communicated to the merchant device, the token may be deactivated for that location and/or time such that even if the token was transmitted, it could not be used for payment, and/or the token may not be authorized for use by the token provider, such as when the merchant requests authorization from the token provider to use the token for payment of the transaction.

For another example, if a user has specified that the identification document token 124 can be provided to an external device, e.g., a POS device, when the location of the user device is within an airport, a liquor store, a government building, or any other places where a legitimate need for a user identification exists, but the current GPS location of the user device shows that the user is located in a high crime neighborhood or other unauthorized location (such as set by the user or the token provider), the access control module 130 may refuse to provide a user identification token to the requesting external device.

In some implementations, the access control module 130 wirelessly, e.g., through a Wi-Fi connection, a Bluetooth connection, or a cellular connection, transmits a token to an external device.

Note that the biometric data collected from a user, for example, the eye iris pattern 200, the fingerprint 204, and/or the voice pattern 206, is provided to the user device 102—but not to the external device 210.

Further, the user device affirmatively, e.g., through data control, protection, storage, and other security policies, prevents the user biometric data from being transmitted or otherwise retrieved out of the user device in one embodiment. For example, after determining that a fingerprint collected from a user matches that stored in the secure element, the user device may digitally destroy the fingerprint.

This is technically advantageous, because a user may have confidence to provide biometric or other sensitive data to her own device, but may not have as much confidence to provide such sensitive data to an external device over which the user may not have sufficient control, such as a merchant point of sale device or terminal. Also, user biometric data is not compromised even when a breach at an external device occurs if the data does not reside in the external device.

Figure 3:
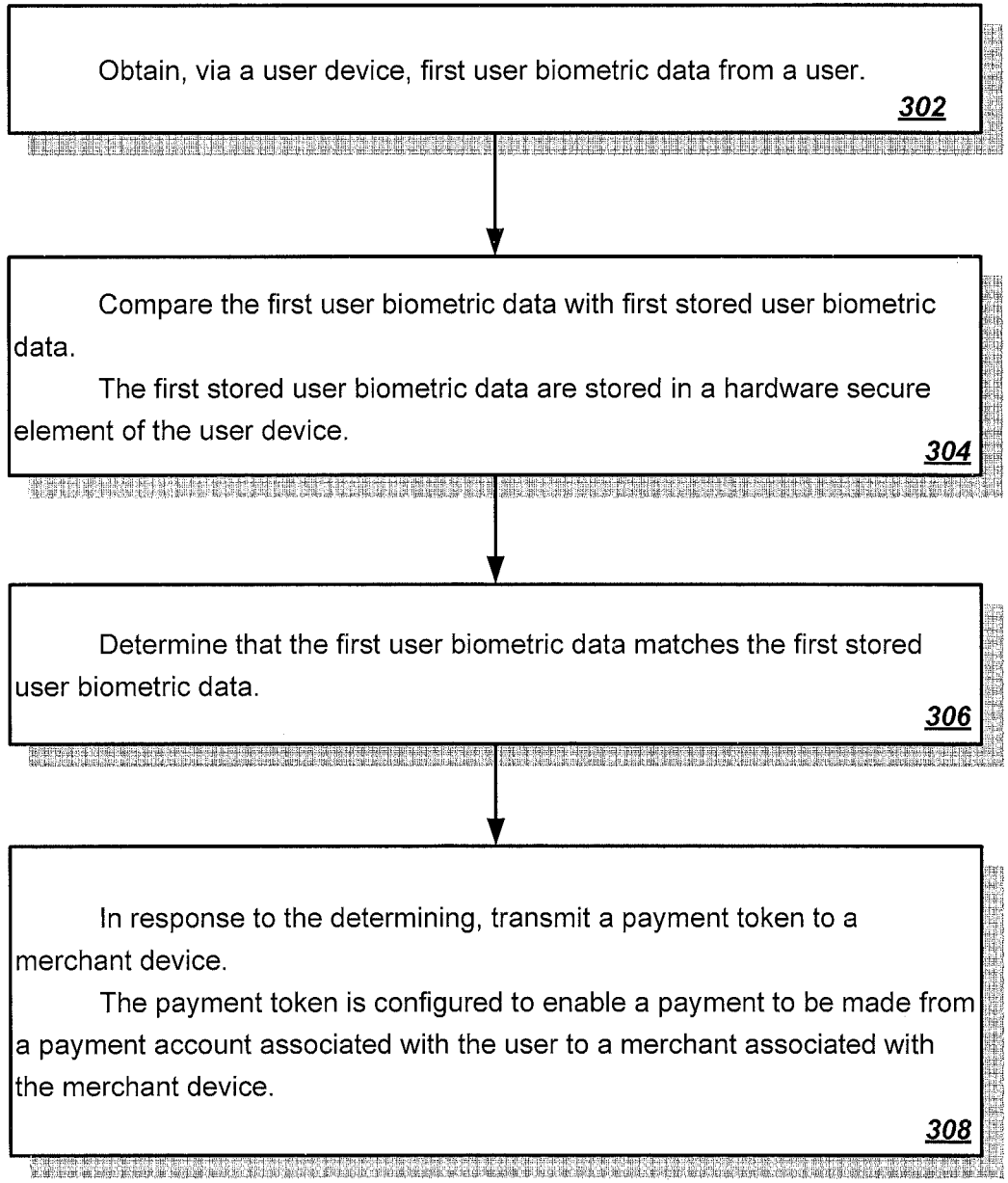
FIG. 3 is a flow chart illustrating an embodiment of a method for user authentication and confidential information management using a hardware component.

FIG. 3 is a flow chart illustrating an embodiment of a method 300 for user authentication and confidential information management using a hardware component. The device 102, for example, when programmed in accordance with the technologies described in the present disclosure, can perform the method 300.

In some implementations, the method 300 includes, obtaining (302), via a user device, first user biometric data from a user. For example, a user device may request a user to speak a sentence ("That was easy!") into a microphone and collects the corresponding voice data detected by the microphone.

In some implementations, the method 300 includes, comparing (304) the first user biometric data with first stored user biometric data. The first stored user biometric data is stored in a hardware secure element of the user device.

For example, a user device may compare a voice pattern determined from a user speech with a voice pattern known to belong to a holder of a payment account, to determine whether the user speech was provided by the account holder. A user device may compare a handwriting pattern determined from a user signature with a handwriting pattern known to belong to a holder of a payment account, to determine whether the user providing the handwriting is the account holder. When a user device is equipped with a touchscreen, the user device may collect a user's palm or finger print and compare to that known to belong to an account holder.

In some implementations, the method 300 includes, determining (306) that the first user biometric data matches the first stored user biometric data. In some implementations, a match beyond a predefined threshold is needed, for example, a ten-point fingerprint match, a 50% voice pitch match, or a 30% facial feature (e.g., a pair of small eyes and a big nose) match. A perfect or 100% match may not be required.

In some implementations, the method 300 includes, in response to the determining, transmitting (308) a payment token to a merchant device. When the biometric data collected from a user matches that known to belong to an account holder, the user device provides a corresponding payment token or identification document token to the merchant device that is requesting the token.

The payment token is configured to enable a payment to be made from a payment account associated with the user to a merchant associated with the merchant device. The payment token is encrypted such that a merchant device or any other device that is not part of a server system of the payment service provider cannot decrypt.

In some embodiments, a payment or identification document is generated in accordance with one or more encryption and decryption algorithms (e.g., symmetric or asymmetric). A public key and private key pair may be used to encrypt and decrypt a token. For example, a payment account number may be encrypted with a public key and the corresponding private key is provided as a payment token and stored in the secure element of a user device. When making a payment, a user device may provide the private key to a merchant device, which in turn provides the private key to the server system. The server system may then use the private key to identify the corresponding payment account.

In some embodiments, a symmetric encryption/decryption algorithm may be used. For example, a payment token may be generated in accordance with a key (known to both the server system 160 and a user device 102). When presenting the token for the purpose of making a payment to a merchant associated with a merchant device, the user device transmits the token to a merchant device. The merchant device does not possess the key and is thus not able to decrypt the token. The merchant device may, however, present the token for payment processing to a server system of the payment service provider. Because the payment service provider system possesses the key, it can decrypt the token to identify the correct account number.

In some implementations, the method 300 optionally includes, determining one or more restrictions on transmitting the payment token to the merchant device or otherwise using the payment token for the transaction. In some embodiments, the access control module of a user device may identify information collectable by a user device at the time of a transaction and determine whether a user-provided restriction on token usage is triggered. In some implementations, the one or more restrictions include one of: a location restriction, a time restriction, and an amount restriction.

For example, a user device may determine whether a merchant device requesting a payment is located in a particular country, state, city, town, street block, or region, as specified previously by an authorized user, e.g., an account holder.

For example, a user device may determine whether a transaction that a merchant device is requesting a payment for has a transaction amount greater than a preset threshold amount or has transaction details descriptive of an item that a user has previously authorized to buy or prohibited from buying.

In some implementations, the method 300 optionally includes, determining that at least one restriction is triggered; and in response to the determining, disabling the payment token.

If an external device is requesting a token in violation of a user-provided restriction, the user device may refuse to provide the token to the external device. For example, if a user has previously specified that a payment cannot be made to buy liquor, then when a POS machine identified as belonging to a liquor store is requesting a payment form a user device, the user device may refuse the request.

In some implementations, once detecting that a user restriction is triggered, the user device may further disable one or more payment tokens for future uses. Because the fact that a restriction is triggered may suggest that an un-authorized transaction has been attempted, future transactions based on the user device may be suspended pending a successful user authentication or re-authentication (e.g., another fingerprint match).

In some implementations, the payment token is wirelessly transferred or communicated to the merchant device. For example, a payment token may be transferred to a POS machine using a Bluetooth protocol. This is sometimes referred to as no-touch or contactless technology.

In some implementations, the method 300 optionally includes, preventing the first user biometric data from being transmitted to a second device other than the user device. The access control module may affirmatively prevent biometric data collected from a user from being transmitted outside the user device. For example, voice data collected from a user is destroyed in an unrecoverable manner (e.g., overwritten with junk data) once a determination of match or no-match is made. In another example, user fingerprints or any related metadata, once collected by a user device, are placed and their access restricted in compliance with access control policies dictated by the user device.

In some implementations, a method for making available a user identification document is provided.

The method may include obtaining, via a user device, first user biometric data from a user; comparing the first user biometric data with first stored user biometric data, wherein the first stored user biometric is are stored in a hardware secure element of the user device; and determining that the first user biometric data matches the first stored user biometric data.

In some implementations, the method may additionally include, in response to the determining, transmitting a user identity token to a second device. The user identity token is configured to enable the second device to verify the identity of the user.

In some implementations, a user identity token enables an entity in possession of the token to verify the identity of the user. A user identity token may be an identifier ("AJKJKFDF**&") that uniquely identifies a user in an official government database as a state employee travelling in the State of the California as a person above the age of 21 in general or as the U.S. citizen "John Doe" residing at the 105 Beach Park Blvd, San Mateo, Calif., 94404, USA, more specifically.

Figure 4:
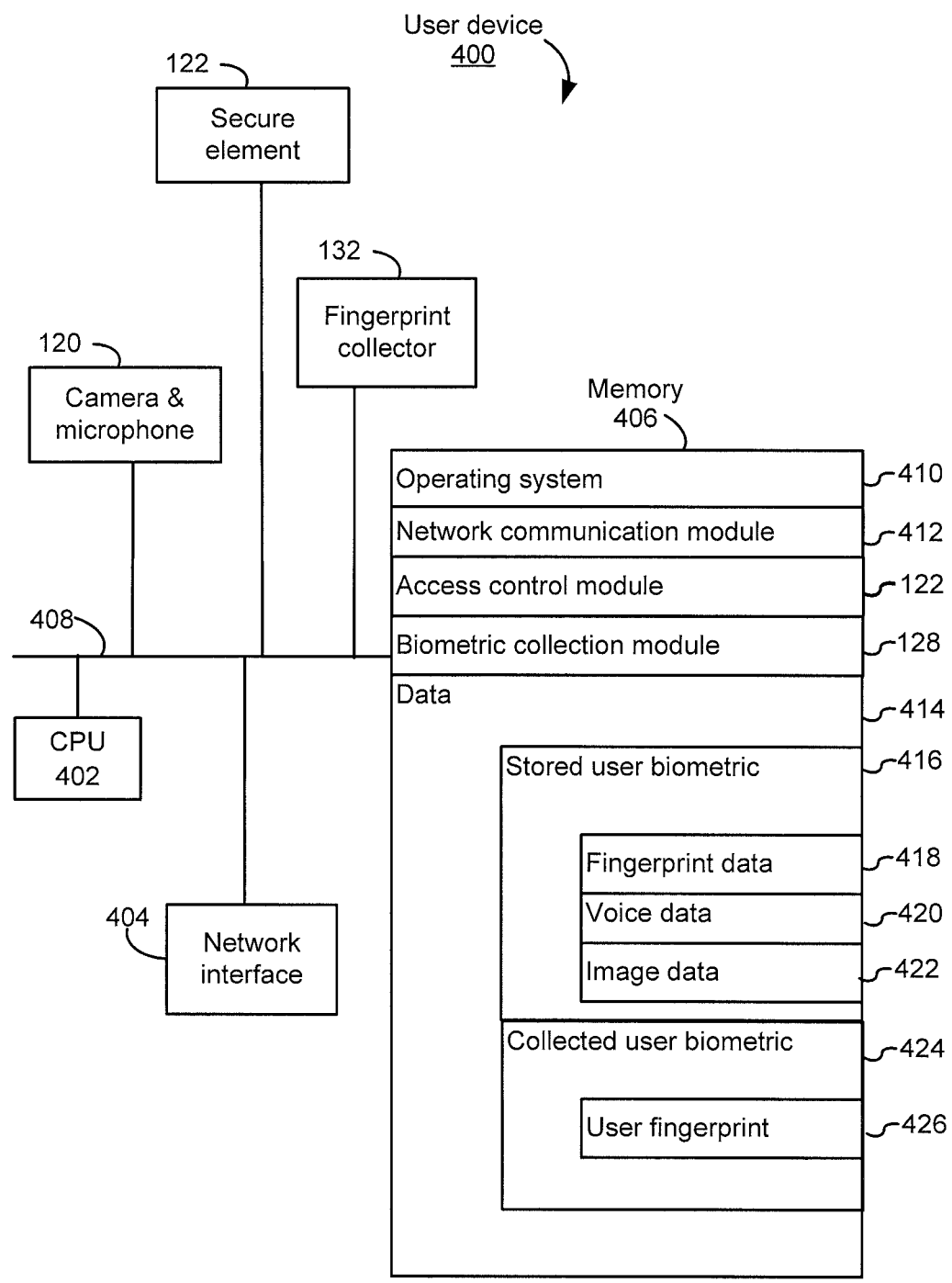
FIG. 4 is a schematic view illustrating an embodiment of a user device.

FIG. 4 is a schematic view illustrating an embodiment of a user device 400, which can be the device 102 shown in FIG. 1. The device 400 in some implementations includes one or more processing units CPU(s) 402 (also referred to as hardware processors), one or more network interfaces 404, a memory 406, and one or more communication buses 406 for interconnecting these components. The communication buses 406 optionally include circuitry (sometimes called a chipset) that interconnects and controls communications between system components. The memory 406 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:

- an operating system 410, which includes procedures for handling various basic system services and for performing hardware dependent tasks;
- a network communication module (or instructions) 412 for connecting the device 400 with other devices (e.g. the merchant device 210 or the server system 106) via one or more network interfaces 404 (wired or wireless) or via the communication network 104 (FIG. 1);
- an access control module 122 for controlling access and transmission of a payment token, an identification document token, or both, by and to another device other than the user device 400;
- a biometric collection module 128 for collecting user biometric data (e.g., a fingerprint or a facial feature) from a user;
- data 414 stored on the device 400, which may include:
    first user biometric (stored in the secure element) 416, which may include:

user finger print data 418, voice data 420, image data 422; and second user biometric 424 collected from a user, which may include a user fingerprint 426 collected via the fingerprint collector 132.

The device 400 may also include a secure element 122 for storing one or more payment tokens, one or more identification tokens, and user biometric data known to belong to an authorized user, a camera and microphone 120 for capturing image and voice data of a user, e.g., a facial feature, a pronunciation, a tattoo, and other distinguishing bodily features of the user, and a fingerprint collector 132.

In some implementations, one or more of the above identified elements are stored in one or more of the previously mentioned memory devices, and correspond to a set of instructions for performing functions described above. The above identified modules or programs (e.g., sets of instructions) need not be implemented as separate software programs, procedures or modules, and thus various subsets of these modules may be combined or otherwise re-arranged in various implementations. In some implementations, the memory 406 optionally stores a subset of the modules and data structures identified above. Furthermore, the memory 406 may store additional modules and data structures not described above.

Figure 5:
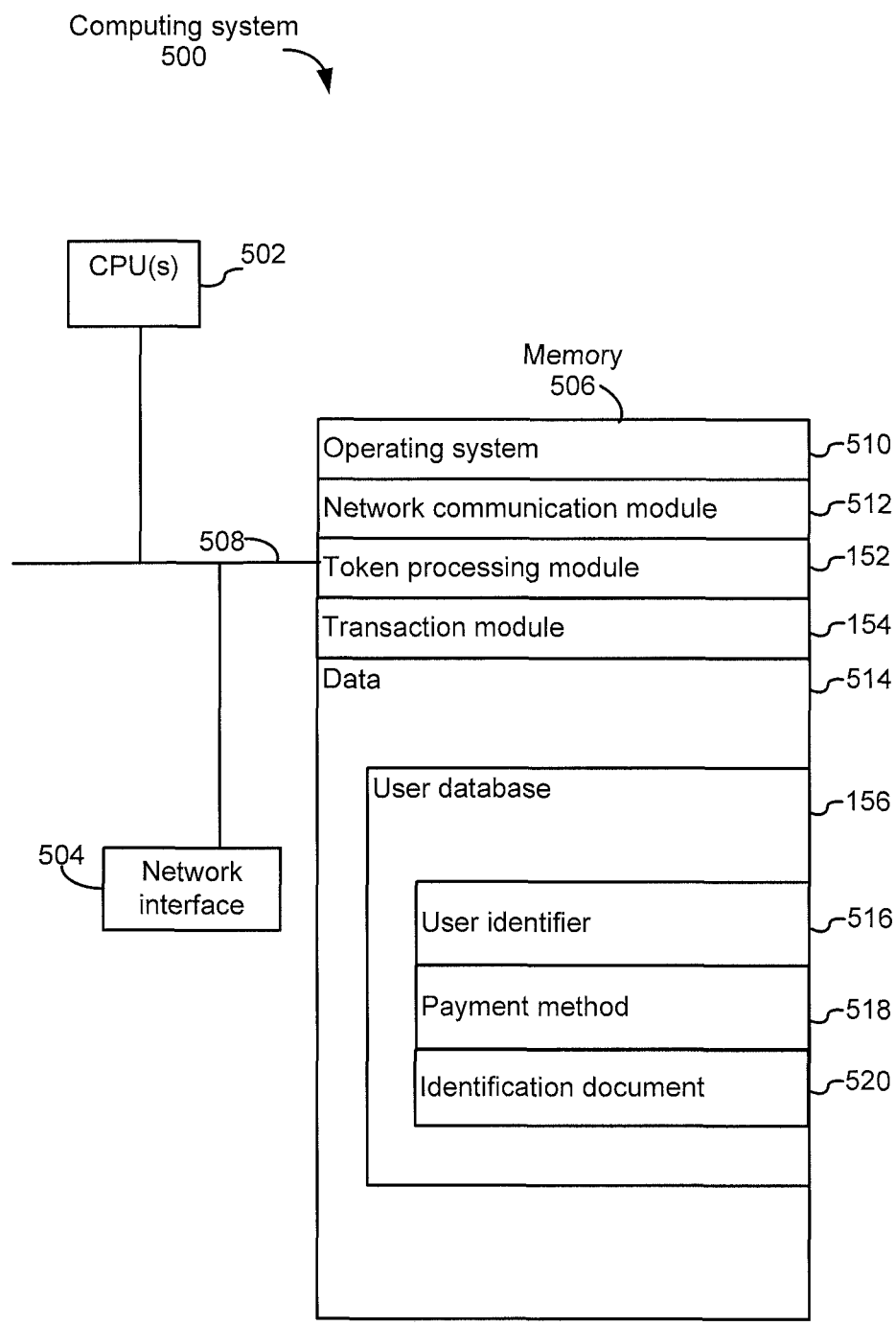
FIG. 5 is a schematic view illustrating an embodiment of a computing system.

FIG. 5 is a schematic view illustrating an embodiment of a computing system 500, which can be the server system 106 shown in FIG. 1. The system 500 in some implementations includes one or more processing units CPU(s) 502 (also referred to as hardware processors), one or more network interfaces 504, a memory 506, and one or more communication buses 508 for interconnecting these components. The communication buses 508 optionally include circuitry (sometimes called a chipset) that interconnects and controls communications between system components. The memory 506 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506, or alternatively the non-volatile memory device(s) within the memory 506, comprises a non-transitory computer readable storage medium. In some implementations, the memory 506 or alternatively the non-transitory computer readable storage medium stores the following programs, modules and data structures, or a subset thereof:

an operating system 510, which includes procedures for handling various basic system services and for performing hardware dependent tasks;

a network communication module (or instructions) 512 for connecting the system 500 with other devices (e.g., a user device 102 or a merchant device 210) via one or more network interfaces 504;

a token processing module 152 for processing, based on a payment token, a payment from a user account identified by the payment token to a merchant and for providing information capable of verifying an identity of a user based on a user identity token;

a transaction module 154 for conducting a transaction with a merchant device; and data 514 stored on the system 500, which may include:

a user database 156 which may include:

a user identifier 516, e.g., a user name, for identifying a user;

a payment method 518 registered by the user identified by the user identifier 516, e.g., a credit card account; and an identification document 520 for verifying the identity of the user identified by the user identifier 516, in accordance with one or more governmental or official standards, e.g., an e-passport.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 506 optionally stores a subset of the modules and data structures identified above. Furthermore, the memory 506 may store additional modules and data structures not described above.

Although FIGS. 4 and 5 show a "user device 400" and a "computing system 500" and respectively, FIGS. 4 and 5 are intended more as functional description of the various features which may be present in computer systems than as a structural schematic of the implementations described herein. In practice, and as recognized by those of ordinary skill in the art, items shown separately could be combined and some items could be separated.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
obtaining, via a user device, first user biometric data from a user;
comparing the first user biometric data with first stored user biometric data, wherein the first stored user biometric data is stored in a hardware secure element of the user device;
determining that the first user biometric data matches the first stored user biometric data;
in response to the determining, further determining a compliance with a specified restriction for transmitting a payment token to a merchant device; and
after the further determining, transmitting the payment token to the merchant device, wherein the payment token is configured to enable a payment to be made from a payment account associated with the user to a merchant associated with the merchant device.

2. The method of claim 1, wherein the payment token is encrypted, and wherein the payment token is configured to enable decryption by a payment service provider device in communication with the merchant device.

3. The method of claim 1, wherein the specified restriction includes one of: a location restriction, a time restriction, or an amount restriction.

4. The method of claim 1, further comprising:
determining that the specified restriction is triggered; and
in response to the determining that the specified restriction is triggered, disabling the payment token.

5. The method of claim 1, wherein the payment token is wirelessly transferred to the merchant device.

6. The method of claim 1, wherein the first user biometric data includes one of: a voice fingerprint, a user fingerprint, an eye feature, or a facial feature.

7. The method of claim 1, further comprising: after the determining that the first user biometric data matches the first stored user biometric data, destroying the first user biometric data to prevent the first user biometric data from being transmitted to a second device other than the user device.

8. A non-transitory machine-readable medium having stored thereon machine-readable instructions executable to cause a machine to perform operations comprising:
obtaining, via a user device, first user biometric data from a user;
accessing first stored user biometric data from a hardware secure element of a user device;
comparing the first user biometric data with the first stored user biometric data;
determining that the first user biometric data matches the first stored user biometric data;
in response to the determining, further determining a compliance with a specified restriction for enabling use of a payment token to effectuate a payment for a particular transaction; and
after the further determining, enabling use of the payment token for a subsequent payment from a payment account associated with the user to a merchant associated with a merchant device.

9. The non-transitory machine-readable medium of claim 8, wherein the: payment token is an encrypted payment token, and wherein the encrypted payment token is configured to enable a decryption of the encrypted payment token by a payment service provider device in communication with the merchant device.

10. The non-transitory machine-readable medium of claim 8, wherein the operations further comprise:
determining that the specified restriction is triggered; and
in response to the determining that the specified restriction is triggered, disabling the payment token.

11. The non-transitory machine-readable medium of claim 8, wherein the first user biometric data includes one of: a voice fingerprint, a user fingerprint, an eye feature, or a facial feature.

12. The non-transitory machine-readable medium of claim 8, wherein the operations further comprise: after the determining that the first user biometric data matches the first stored user biometric data, destroying the first user biometric data to prevent the first user biometric data from being transmitted to a second device other than the user device.

13. A method, comprising:
obtaining, via a user device, first user biometric data from a user;
accessing first stored user biometric data from a hardware secure element of the user device;
comparing the first user biometric data with the first stored user biometric data;
determining that the first user biometric data matches the first stored user biometric data;
in response to the determining, further determining a compliance with a specified restriction for transmitting a user identity token to a second device; and
after the further determining, transmitting the user identity token to the second device, wherein the user identity token is configured to enable the second device to verify an identity of the user.

14. The method of claim 13, wherein the user identity token includes an encrypted user identity token, and wherein the encrypted user identity token is configured to enable a decryption of the encrypted user identity token by the second device.

15. The method of claim 13, wherein the specified restriction includes one of: a location restriction, a time restriction, or a token requestor restriction.

16. The method of claim 13, further comprising:
determining that the specified restriction is triggered; and
in response to the determining that the specified restriction is triggered, disabling the user identity token.

17. The method of claim 13, further comprising: in response to the determining, presenting the user identity token on the user device.

18. The method of claim 13, wherein the first user biometric data includes one of: a voice fingerprint, a user fingerprint, an eye feature, or a facial feature.

19. The method of claim 13, further comprising: after the determining that the first user biometric data matches the first stored user biometric data, destroying the first user biometric data to prevent the first user biometric data from being transmitted to a second device other than the user device.

20. The method of claim 13, wherein the user identity token corresponds to a government issue identification document of the user.

* * * * *

UNITED STATES PATENT AND TRADEMARK OFFICE
CERTIFICATE OF CORRECTION

Page 1 of 1

PATENT NO. : 10,546,297 B2
APPLICATION NO. : 15/199637
DATED : January 28, 2020
INVENTOR(S) : Satish Narayan Govindarajan et al.

It is certified that error appears in the above-identified patent and that said Letters Patent is hereby corrected as shown below:

In the Claims

In Claim 19, Column 12, Line 59: please omit "second" after "a"

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*